United States Patent Office 3,475,364
Patented Oct. 28, 1969

3,475,364
ART OF PRODUCING DYEABLE ACRYLONITRILE COPOLYMER COMPOSITIONS AND ARTICLES
Louis E. Trapasso, Westfield, N.J., assignor to Celanese Corporation, New York, N.Y., a corporation of Delaware
No Drawing. Filed Oct. 17, 1966, Ser. No. 586,991
Int. Cl. C08f 27/06
U.S. Cl. 260—32.6                                 19 Claims

ABSTRACT OF THE DISCLOSURE

A method for improving basic dyeability of acrylonitrile polymers and an improved acrylonitrile composition containing a sultone which provides improved dyeability. The composition is prepared by reacting a described sultone with an acrylonitrile copolymer which contains an alkali metal soap group therein, thereby incorporating the sultone into said acrylonitrile copolymer to provide basic dyeability.

---

This invention relates broadly to the art of producing dyeable acrylonitrile copolymer compositions and shaped articles, and more particularly to technique whereby polymeric acrylonitrile is rendered dyeable with cationic dyes. The compositions and shaped articles made from the compositions are characterized, in general, by having an improved and unobvious degree of washfastness after they have been dyed with a cationic (i.e., basic) dye as compared with the usual acrylonitrile polymer that has been modified to improve its basic dye receptivity. The scope of the invention includes both composition, article, and method features.

It is known that homopolymeric acrylonitrile and copolymers of acrylonitrile into which no dye sites have been introduced as an integral part of the polymer molecule or otherwise are extremely difficult to dye satisfactorily with conventional acid and basic dyes. Various and sundry means have been suggested and are in use for overcoming or minimizing the problem of dyeing acrylonitrile polymers effectively and economically without adversely affecting the other useful and/or commercially desirable properties of shaped articles (e.g., films, filaments, etc.) fabricated from the polymers. The present invention is a different solution to the problem of dyeing an acrylonitrile polymer with a basic dye that has certain advantages over the prior-art techniques.

Accordingly, it is one of the primary objects of the present invention to produce new acrylonitrile copolymer compositions which are more readily dyed, especially with basic dyes, than homopolymeric acrylonitrile or many of the copolymers of acrylonitrile and one or more other monomers that were known or suggested prior to the instant invention.

Another object of the invention is to prepare such copolymers that can be spun, cast, or otherwise shaped to form filaments (mono- or multifilaments), films, rods, tubes, bars, ribbons, tapes, sheets, yarns, tows, and the like, and the shaped articles then dyed either before or after having been oriented (e.g., by stretching) and/or made into fabrics in knitted, woven, felted, or other form.

A further object of the invention is to provide copolymeric acrylonitrile compositions and shaped articles having improved washfastness after having been dyed with a basic dye.

Another object of the invention is to provide acrylonitrile copolymers having a relatively high percentage of basic dye sites and which, therefore, are eminently suitable for use as a component of blends with one or more polymers that contain no such dye sites thereby to impart basic dyeability to the latter.

Still another object of the invention is to provide methods of making the acrylonitrile copolymer compositions and the shaped articles of the invention.

Other objects of the invention will be apparent to those skilled in the art from the description and examples that follow.

In general, the objects of the invention are attained by effecting reaction, at ambient temperature or under mild heat (e.g., a maximum of about 60° C.) between (a) a sultone selected from the group consisting of naphthosultones and sultones represented by the general formula I 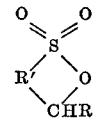

wherein R represents hydrogen or a lower alkyl radical and R' represents an alkylene (including cycloalkylene) or arylene radical containing from 1 to 6 carbon atoms, inclusive, and (b) an acrylonitrile copolymer containing moieties represented by the general formula II 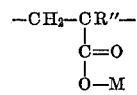

where R" represents hydrogen or a methyl radical and M represents an alkali metal. The moieties embraced by Formula II constitute from 0.2 to about 45 percent, more particularly from about 0.5 to about 15 or 20 percent, and still more particularly from about 1 or 2 to about 10 or 12 percent of the total number of mers from individual monomers in the acrylonitrile copolymer of (b). The term "mers" designates the polymer unit comprising the residue of a monomer in polymerized form. The amount of the sultone reactant employed is the stoichiometrical equivalent theoretically required to convert some or all of the

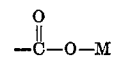

groups in the aforesaid moieties to

groups wherein R and R' have the same meanings as given above with reference to Formula I; and, when all of the said

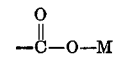

groups are desired to be converted, the amount of the sultone is at least the stoichiometrical equivalent (preferably up to about 5% in excess) that is theoretically required to effect the said conversion.

Illustrative examples of lower alkyl radicals represented by R in Formula I are methyl, ethyl, and the normal and isomeric forms of propyl through hexyl radicals. Illustrative examples of radicals represented by R' in Formula I are methylene, ethylene, and the normal and isomeric forms of propylene through hexylene radicals; the cyclopentylene and cyclohexylene radicals; and the phenylene radical. Advantageously the total number of carbon atoms in the combined groupings represented by CHR and R' in Formula I does not exceed about 10 carbon atoms and usually is not more than about 7 carbon atoms.

More specific examples of the sultones used in practicing this invention are the following:

1,8-naphthosultone, the formula for which is

III 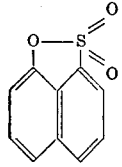

alpha-hydroxy-o-toluenesulfonic acid sultone, the formula for which is

IV 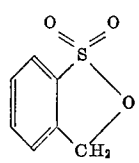

4-hydroxy-1-butanesulfonic acid sultone
3-hydroxy-1-propanesulfonic acid sultone (also known as 1,3-propane sultone)
3-hydroxy-1-octanesulfonic acid sultone
4-hydroxy-1-pentanesulfonic acid sultone
4-hydroxy-2,2,4,4-tetramethylbutanesulfonic acid sultone
5-hydroxy-1-pentanesulfonic acid sultone
6-hydroxy-1-hexanesulfonic acid sultone.

In a preferred method of preparing the copolymers of this invention a copolymer is made that contains acrylonitrile and an ethylenically-unsaturated carboxylic acid, more particularly acrylic and/or methacrylic acid, with or without one or more other monomers having terminal ethylenically-unsaturated groupings, which latter monomers are free from dye sites for basic dyes. The proportions of the comonomers in making the copolymer are selected so that the average number of moieties of the carboxylic acid present therein, with respect to the total number of mers from individual monomers, are within the broad (0.2 to about 45) and narrower ranges previously given with regard to the moieties embraced by Formula II.

Such copolymers are prepared in known manner, using bulk, solution, suspension, or emulsion polymerization techniques, and preferably with the aid of some form of catalytic influence including heat, light, irradiation, catalysts, or various combinations thereof as desired or as may be required. Thus, they can be produced by emulsion copolymerization in an aqueous medium containing a suitable polymerization catalyst (initiator of polymerization).

Any of the catalysts, especially those of the so-called "free-radical" type, commonly employed in polymerizing compounds containing an ethylenically-unsaturated grouping, specifically a vinyl grouping, can be used. Such catalysts include the various organic and inorganic peroxy compounds, more particularly the organic peroxides, e.g., tert.-butyl hydroperoxide; the salts of inorganic per-acids, e.g., ammonium persulfate, sodium persulfate, and potassium persulfate; the azo-type catalysts, e.g., $\alpha,\alpha'$-azodiisobutyronitrile; and the various redox-catalyst systems, e.g., ammonium or potassium persulfate and sodium meta-bisulfite, sodium chlorate and sodium sulfite, as well as others known in the art.

In a typical procedure using the emulsion-polymerization technique, the polymerization mixture, at the end of the reaction period, is in the form of a thin emulsion containing about 20% copolymer solids. This acrylonitrile copolymer containing carboxylic (acrylic and/or methacrylic) acid units in its molecular structure can be precipitated from the cooled reaction mixture in the form of an acrylonitrile copolymer containing salt moieties of the kind embraced by Formula II by neutralization with, for example, an alkali-metal hydroxide such as a dilute aqueous solution of sodium or potassium hydroxide. The amount of the added base is such as to provide a pH of 7.0 in the reaction mixture. Partial neutralization is attained, if desired, by adding a lesser amount of base. The product is isolated by any suitable means, e.g., by filtration, centrifuging, etc., and then dried at ambient or at an elevated temperature.

The resulting copolymer has a molecular weight that may be varied over a wide range depending upon the particular intended purpose of the final copolymer, but usually has an inherent viscosity (a relative measure of viscosity) within the range of from about 0.5 to about 3.0 as measured using a 0.1 weight percent concentration of copolymer in dimethylformamide (DMF) at 25° C.

The salt-form of acrylonitrile copolymer is then dissolved in an organic solvent. The solvent should be one in which the acrylonitrile copolymer is soluble (at least at extrusion temperatures) and which is inert (substantially inert) in contact with a sultone of the kind embraced by Formula I. Suitable organic solvents for the intended purpose are disclosed in U.S. Patents 2,404,713–728 directed to organic-solvent solutions of homopolymeric acrylonitrile and copolymers of at least 85% by weight of acrylonitrile with another monomer, and to the use of such solutions in making films, filamentary materials, and the like.

Specific examples of organic solvents that may be employed in dissolving the salt-form acrylonitrile copolymer to form a solution to which the sultone reactant is then added are dimethylformamide, N,N-dimethylacetamide (DMA), dimethyl sulfoxide, dimethyl sulfone, ethylene thiocyanate, trimethylene thiocyanate, ethylene carbonate, and propylene carbonate.

The dissolution of the salt-form acrylonitrile copolymer in the organic solvent is accelerated by using a copolymer which is in finely divided state, e.g., one which, if not in finely divided state as originally formed, has been ground so that all or substantially all of it will pass through a U.S. Standard Sieve Series No. 50 screen. It is also usually desirable to agitate the mass, as by mechanical stirring, while dissolving the copolymer in the solvent. To avoid or minimize discoloration of the acrylonitrile copolymer, it is generally advantageous to employ the lowest possible temperature in effecting dissolution thereof that is consistent with practical considerations, e.g., the time required for effecting solution, etc.

The proportions of the acrylonitrile copolymer in the organic solvent may be varied widely depending mainly upon whether or not it is intended to prepare the sultone-reaction product (i.e., sultone-addition product or adduct) of the acrylonitrile copolymer in a highly concentrated solution, which is subsequently diluted with the same or a different solvent to the lower concentration at which it is to be ultimately used, for instance in making filamentary materials, films, or other shaped articles; or whether one desires to obtain the latter type of solution directly, that is, without an intermediary dilution step. Ordinarily, the last-described technique is preferred. In this case the amount of salt-form acrylonitrile copolymer that is dissolved in the organic solvent is generally added in an amount such that the solution contains from about 5 to about 30, and preferably from about 10 to about 20 or 25 weight percent of the said copolymer, especially when the final solution of the sultone adduct of the acrylonitrile copolymer is to be used in the spinning of filaments or in the casting of films.

The aforementioned sultone adduct of the acrylonitrile copolymer is obtained in situ by adding to the above-described solution of the lower (5–30 weight percent) salt-form copolymer concentrations, or in more highly concentrated form, a sultone of the kind embraced by Formula I in a stoichiometrical amount theoretically equivalent to that required to convert some or all of the

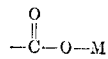

groups in the moieties within the scope of Formula II to

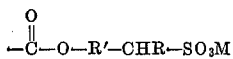

groups wherein R and R' have the same meanings as previously given with respect to Formula I and M has the same meaning hereinbefore defined with reference to Formula II. This mixture is agitated at a temperature and for a period of time sufficient to effect the conversion just described, for example at a temperature within the range of from 40° C. to about 90° C. for a period of time of from about ¼ to about 4 hours, the longer periods being used at the lower temperatures.

The concentration of the sultone adduct of the acrylonitrile copolymer in the organic solvent solution will, of course, be slightly higher than the aforementioned concentration of the salt-form copolymer therein (5–30 weight percent in the broader range, and 10 to 20–25 weight percent in the narrower ranges). Hence, as desired or as may be required because of the particular end-use of the solution of the sultone-modified acrylonitrile copolymer, one may add more organic solvent to the solution to reduce the concentration of the copolymer to approximately the same level that existed prior to the formation of the sultone adduct in the solution.

As will be readily understood by those skilled in the art, the aforementioned ranges of concentrations are mentioned as indicative of concentrations that may be employed, and the invention obviously is not limited to the use of only such concentrations. Especially in spinning and casting applications of the compositions, the important factor is that the concentration of the sultone adduct of the acrylonitrile copolymer in the organic solvent be such that the viscosity of the liquid composition at the operating temperature is within a workable range.

Satisfactory viscosities at the usual operating temperatures generally prevail when the sultone-copolymer adduct constitutes from about 10 to about 25 or 25 weight percent of the organic-solvent solution thereof, but this also is dependent upon the average molecular weight of the adduct, which usually exceeds about 10,000 advantageously exceeds about 20,000, and preferably is within the range of from 40,000 or 50,000 to 150,000 or 200,000, or even 250,000 or 300,000 or more, as determined from viscosity measurements and calculations by the Staudinger equation. For some applications, it may sometimes be desirable to prepare a sultone adduct of the acrylonitrile copolymer having a molecular weight of even 500,000 or 1,000,000 or more (Staudinger method; reference: U.S. Patent No. 2,404,713). The inherent viscosity (I.V.) of the aforesaid sultone adduct is at least 0.5, advantageously from about 1 to about 3, and preferably from about 1.0 to about 2.0 as measured in a 0.1 weight percent concentration of the adduct in DMF at 25° C.

Because the use of the higher amounts of solvent renders spinning operations more costly and difficult due to the trouble often encountered in rapidly removing large amounts of solvent from the solution and due to the cost of such removal, it is preferable to use a sultone-copolymeric acrylonitrile adduct having a molecular weight such that a maximum amount of the said adduct, consistent with the viscosity of the solution at the operating temperature, can be dissolved in the chosen organic solvent such as DMF, DMA, dimethyl sulfoxide (DMS), and the like. By using said adducts having an average molecular weight (Staudinger method), within the range of from about 40,000 or 45,000 up to about 150,000 or 160,000 it is possible to obtain solutions containing, for instance, from 7 to 8% to 20–25% by weight thereof of the adduct, and having suitable viscosities for use at operating temperatures of the order of, for example, 70° C. to 150° C.

The above-described solutions of the sultone-copolymeric acrylonitrile adduct may be used in the production of various fabricated structures such as, for example, films, filaments, bars, rods, tubes, etc., in accordance with general techniques now generally known to those skilled in the art, the detailed operating conditions being suitably modified where required. Such technique generally involves extruding the solution containing the sultone-reacted copolymer through an opening of predetermined cross-section into a liquid non-solvent for the said copolymer thereby to form a shaped article.

Describing the method of making shaped articles from the solutions (liquid compositions) of this invention more specifically, it may be stated that, in one method of making extruded articles, the solution (advantageously heated to, for instance, 70°–130° C., after having been previously deaerated and filtered) is extruded through a spinneret or die into a liquid non-solvent that will coagulate the sultone-adduct component of the extrudable composition, more particularly spinning solution. The liquid into which the spinning solution is extruded is one which is miscible with the organic solvent component of the solution and which, as a result of extracting the solvent, is capable of coagulating the sultone adduct of the acrylonitrile copolymer. Any liquid which is thus capable of coagulating the sultone adduct may be employed, but preferably the liquid coagulant is one that has no harmful effect upon the aforesaid adduct.

Thus, when the organic solvent component of the spinning solution is, for example, dimethylacetamide, the liquid coagulant of the adduct may be water or almost any aqueous salt solution, e.g., the alkali-metal (specifically the sodium and potassium) and the ammonium chlorides, bromides, sulfates, nitrates, phosphates, acetates, and propionates, as well as water-soluble salts of divalent and trivalent cations, e.g., zinc chloride, calcium chloride, calcium thiocyanate, aluminum sulfate, and their obvious equivalents.

The liquid coagulant that is suitable for use with any particular solvent solution of the sultone adduct is readily ascertained by checking the literature or by simple experimentation as to those compounds or substances in which the chosen organic solvent component of the spinning solution is soluble at a suitable, operating bath temperature and in which the sultone adduct of the acrylonitrile copolymer is sufficiently insoluble to permit coagulation thereof in a relatively short period of time.

The temperature of the coagulating or precipitating bath may be varied as desired or as conditions may require depending upon the chosen organic solvent component of the spinning solution and the chosen liquid coagulant. Generally the coagulating bath temperature is within the range of from about 0°–10° C. to about 100° C., and is preferably not higher than about 70° or 80° C. in order to minimize discoloration of the acrylonitrile copolymer adduct with the sultone.

It will be understood, of course, by those skilled in the art that the temperature of the liquid coagulating bath (sometimes called a "spin" bath) should be such as to dissolve the solvent from the extruded mass most rapidly and effectively. The length of travel of the shaped article through the bath may be varied as desired or as may be required by the other particular operating conditions. However, in all cases the length of travel should be sufficient to effect solidification of the sultone adduct and to extract from the extruded mass substantially all of the organic solvent; or, if desired, only a part of it so that, for example, from 0.5 or 1% to 15 or 20% or more, by weight of the whole, remains in the extruded mass as a fugitive or permanent plasticizer of the aforesaid adduct.

The spun filamentary material or other extruded article is preferably treated in, or after leaving, the coagulating bath in order to orient the molecules along the fiber axis and thereby to increase the tensile strength and otherwise improve the properties of the spun material. Orientation may be effected by stretching the thread or strand at any suitable stage of the spinning operation but preferably while the spun filament or thread still contains at least some of the solvent. Stretching may be accomplished by passing the thread or yarn between two or more positively driven rolls or godets, the peripheral speeds of which are adjusted so that the thread, yarn, tow, or the like is stretched to the desired degree.

The amount of stretch that is applied to the filamentary material may be varied widely, but in all cases should be sufficient to cause at least appreciable orientation of the molecules along the fiber axis and an improvement in the properties of the material undergoing treatment. The amount of tension to which the filamentary material is subjected should not be so great as to cause it to break (i.e., appreciable or substantial breakage of the individual filaments of the strand or yarn). Depending, for example, upon the type or kind of material being stretched and the particular properties desired in the finished product, the amount of stretch may vary, for instance, from 100%, preferably from 200 or 300%, up to 600 or 700% or more of the original length of the filamentary material.

The stretch may be applied gradually by passing the strand or the like over a plurality of godets having increasing peripheral speeds. The stretched filamentary material may be wound upon a spool or it may be collected in a centrifugal pot, whereby twist advantageously is applied to the filamentary bundle. Alternatively, the stretched filamentary material may be led over a thread-storage device on which it may be treated with a suitable solvent to remove all or part of the coagulant and/or organic solvent component of the spinning solution that may not previously have been removed, after which it may be continuously dried, oiled, and taken up on a twisting device, such, for instance, as a ring-twisting spindle.

The extruded filamentary material may be given part or all of its total stretch in a liquid medium such as that which constitutes the coagulating bath, or in any other suitable medium, and a suitable temperature. Thus, the stretch may be applied while the yarn or the like is being passed through a gaseous medium, e.g., air, nitrogen, flue gases, etc., or through a liquid medium, e.g., water, or such media as are employed for coagulating the sultone-acrylonitrile copolymer adduct. To obviate or minimize discoloration of the aforesaid adduct, the temperature of the medium in which the filamentary material is stretched and its rate of travel therethrough should be adjusted so that overheating of the material does not occur. Ordinarily the temperature of the medium in which stretching is effected is below 200° C., e.g., at 70° to 140° C.

The highly stretched product is strong, tough and pliable, and shows a high degree of orientation along the fiber axis by X-ray diffraction.

Instead of forming a shaped article such as filamentary material by a wet-spinning method as previously has been described, the filamentary material may be produced by dry-spinning technique. This technique is more fully described and illustrated by specific examples directed to dry-spinning of organic-solvent solutions of homopolymeric acrylonitrile and copolymers of acrylonitrile, different from those with which this invention is concerned, in U.S. patents included in the previously mentioned patent group, viz., 2,404,713–728.

The solvent solutions of the sultone adduct of the acrylonitrile copolymer also can be cast in the form of films. For instance, the hot liquid composition may be cast upon a revolving drum which is partly immersed in a coagulating bath, such as mentioned hereinbefore, and which will serve to deposit the aforesaid adduct as a thin film on the drum as it passes through the bath. The resulting film may be stretched, if desired, lengthwise and crosswise by suitable, commercially available apparatus to improve its properties.

The adducts of a sultone with an acrylonitrile copolymer containing moities of the kind embraced by Formula II may be dyed with a basic dye while they are still in unshaped form; or, they may first be shaped, e.g., in the form of filamentary materials which are subsequently dyed either before or after they have been made into fabrics, clothing and the like.

The present invention is not limited to the production of compositions comprising an adduct of a napthosultone or of a sultone of the kind embraced by Formula I and a two-component copolymer of acrylonitrile and an acrylate or methacrylate salt such as sodium or potassium salt. Preferably the carboxylic salt-containing acrylonitrile copolymer with which the sultone is reacted is a copolymer of (A) acrylonitrile, (B) an alkali-metal acrylate and/or methacrylate, specifically sodium or potassium acrylate and/or methacrylate, and (C) at least one (i.e., one, two, three or any desired higher number) other monomer which is copolymerizable with the acrylonitrile of (A) and the monomer(s) of (B) in at least the acid form (or in both acid and salt forms), which contains a terminal ethylenically-unsaturated grouping, and which is free from dye sites for basic dyes.

Advantageously, the different mers from the monomers of (A), (B) and (C) are present in the aforesaid copolymer in average percentage values, based on the total number of mers from individual monomers in the said copolymer, within the following ranges:

(A) from 75% to about 95%, preferably from about 80% to about 95%;
(B) from 0.5% to about 15%, preferably from about 1% to about 10%; and
(C) from 3% to about 15%, preferably from about 4% to about 10%, the total of (A), (B) and (C) being 100%.

Illustrative examples of the one or more monomers that may constitute the monomeric component of (C), supra, are the vinyl esters of aliphatic monocarboxylic acids, e.g., vinyl acetate; vinyl esters of the class exemplified by vinyl benzoate, the various vinyl chlorobenzoates and the various vinyl methoxy-, ethoxy- and higher alkoxybenzoates; styrene and substituted styrenes such as alpha-methylstyrene, alpha-chlorostyrene, 2,5-dichlorostyrene, p-methoxystyrene and p,alpha-dimethylstyrene; olefins of the class exemplified by isobutylene, 2-methyl-1-butene, 2-methyl-1-pentene, 2,6-dimethyl-1-octene and 2,3,3-trimethyl-1-butene; alkyl esters of acrylic and methacrylic acids, e.g., methyl acrylate and methacrylate, ethyl acrylate and methacrylate, and the higher alkyl homologues of acrylic and methacrylic acids; 2-halogenated olefins of the class exemplified by 2-chloroprene, 2-chlorobutene and 2-fluorobutene; isopropenyl esters of organic monocarboxylic acids, e.g., isopropenyl acetate, isopropenyl benzoate and isopropenyl alpha-chloroacetate; vinyl esters of alpha-halogeno saturated aliphatic monocarboxylic acids of the class exemplified by vinyl alpha-chloroacetate; vinyl and vinylidene halides such as vinyl chloride, vinyl bromide, vinylidene chloride, vinylidene fluoride and the like; vinylidene cyanide; methacrylonitrile, ethacrylonitrile and higher alkyl-acrylonitriles of the homologous series; amides of acrylic and methacrylic acids, e.g., the methyl, ethyl, and propyl through amyl (both normal and isomeric forms) acrylamides and methacrylamides, and the N-methyl-, -ethyl-, -propyl-, -butyl-, etc., and the N,N-diethyl-, N,N-diethyl, N,N-dipropyl-, and N,N-dibutylacrylamides and -methacrylamides.

Other examples of the foregoing classes of comonomers are set forth generically, and with other species than those mentioned above, in U.S. Patent No. 3,180,857 of Conciatori and Smart dated Apr. 27, 1965, and assigned to the same assignee as the present invention, and more particularly in column 1, line 26, through line 72 in column 3; and which are described in the said patent as being monomers useful in forming copolymers or interpolymers with vinylidene cyanide.

In order that those skilled in the art may better understand how the present invention can be carried into effect, the following examples are given by way of illustration and not by way of limitation. All parts and percentages are by weight unless otherwise stated.

EXAMPLE 1.—PREPARATION OF TERPOLYMER OF ACRYLONITRILE, METHYL ACRYLATE AND ACRYLIC ACID

Materials and quantities

Surfactant solution:
  Distilled water _____ 600 g.
  Sodium lauryl sulfate (surfactant) _____ 7.5 g.
  Concentrated $H_2SO_4$ _____ 0.5 g.
Monomeric mixture:
  Acrylonitrile _____ 170 g.
  Methyl acrylate _____ 5.0 g.
  Acrylic acid _____ 10.0 g.
Initiator solutions:
  Sodium metabisulfite _____ 1.70 g. in 100 ml. distilled $H_2O$.
  Potassium persulfate _____ 0.85 g. in 100 ml. distilled $H_2O$.

The reaction vessel consists of a two-liter, four-necked flask equipped with a mechanical stirrer, a thermometer and three dropping funnels. The flask and its contents are heated by means of a thermostatic water bath. To the stirred surfactant solution at 45° C. is added 25 ml. of the monomeric mixture followed by 10 ml. of the bisulfite solution and 10 ml. of the persulfate solution. Initiation of polymerization is evidenced by the development of a bluish-white appearance of the reaction mixture. Then, every 10 minutes there is added 20 ml. of the monomeric mixture followed by 10 ml. of the bisulfite solution and 10 ml. of the persulfate solution. At the end of the addition period the pot temperature is increased to 80° C. If refluxing of the monomers has not stopped by the time the pot temperature has reached about 80° C., heating is continued at that temperature until refluxing does stop. The reaction mass is a stable emulsion of a terpolymer of acrylonitrile (AN), methyl acrylate (MA), and acrylic acid (AA) wherein the proportions of the units or mers of the individual starting monomers are of the same general order as those of the charge, viz., 85% AN, 5% MA and 10% AA.

The emulsion is broken and the terpolymer is precipitated in its salt form (i.e., as an acrylonitrile copolymer containing moieties of the kind embraced by Formula II) by adding an aqueous solution of an alkaline base to the cooled aqueous terpolymer emulsion in an amount sufficient to provide a reaction mixture having a pH of 7.0. More particularly, the alkaline base is a dilute aqueous solution of sodium hydroxide containing about 5.0% NaOH.

The product is collected by suction filtration and dried in a vacuum oven for about 16 hours at 80° C. The yield of dried, salt-form terpolymer is 94.7% of the theoretical, and it has an I.V. of 1.99 as measured using a 0.1 wt. percent concentration thereof in DMF at 25° C.

A sample of the dry, white, powdery terpolymer is dissolved in dimethylacetamide (N,N-dimethylacetamide) in an amount such as will provide a solution containing 20% of terpolymer solids. To 100 g. of the resulting solution there is added 1.83 g. of 1,3-propane sultone, which is the stoichiometrical equivalent theoretically required to convert all of the

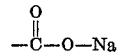

groups in the said terpolymer to

groups, and the solution is heated at 80° C. for about 1 hour to insure completion of the reaction.

Films, about 10 to 15 mils thick, are cast on a glass plate from (a) the dimethylacetamide solution of the sultone adduct of the acrylonitrile terpolymer and (b) a similar solution of the acidic terpolymer before conversion to salt form for reaction with the sultone. These films are dried in a vacuum oven at a temperature of about 60° C. for about 16 hours. The films are stripped from the substrate and dyed in a Sevron Blue B (Basic Blue, Colour Index Number 21) dye bath containing the following ingredients:

Distilled water _____ml__ 1800
Sevron Blue B, a cationic dye _____g__ 0.90
Triton® X-102[1] (surfactant) _____g__ 0.90
Sodium acetate _____g__ 0.30
Glacial acetic acid _____ml__ 0.6
Latyl® carrier A[2] _____g__ 9.00

[1] Triton X-102 is octylphenoxy(polyethoxy)ethanol containing about 10 moles of combined ethylene oxide.
[2] Latyl carrier A is understood to be a mixture of dimethyl terephthalate and benzanilide.

The films are treated in the hot dye solution for 1 hour at 97° C., then rinsed in a 1% green soap solution for another hour at 72° C. The film of (a), which is the sultone adduct of the terpolymer, is dyed heavier (i.e., to a deeper shade of blue) than is the film from (b).

When similar dye tests are made on a film of an acrylonitrile copolymer obtained by copolymerization of 95% acrylonitrile and 5% methyl acrylate, the film is barely stained by the Sevron Blue B dye. This is also true with respect to 100% homopolymeric acrylonitrile films.

The sultone adduct of the terpolymer can be wet-spun into 3-denier filaments from a DMF solution following the general procedure described in U.S. Patent No. 2,615,866. It can also be dry-spun from a DMF solution using the apparatus and following the procedure illustrated in Example 6 of the U.S. Patent 2,821,521. Both the wet-spun and the dry-spun filamentary materials are dyeable to deep shades with a basic dye and have excellent wash-fastness characteristics.

EXAMPLE 2

Same as in Example I with the exception that the proportions of AN, MA and AA in the charge for the preparation of the acidic copolymer are, by weight, 90.5, 7.2 and 2.3 weight percent, respectively. This copolymer is obtained in a yield of 95.0% of the theoretical, and it has an I.V. of 2.20 as measured using a 0.1 wt. % concentration thereof in DMF at 25° C.

Films are cast as in Example I from (a) the dimethylacetamide solution of the sultone adduct of the acrylonitrile terpolymer and (b) a similar solution of the acidic terpolymer before conversion to the salt from for reaction with the sultone. The lowering of the percentage of acrylic acid in the acidic terpolymer from 10% to 2.3%, based on the weight of the monomers charged, gives a film (b) that, like the acidic terpolymer film (b) of Example 1, dyes fairly well. However, in this case the dye washes out completely during rinsing in the hot soap solution. In marked contrast, the dyed film obtained from the solution of (a), i.e., the sultone adduct of the acrylonitrile terpolymer, is much more washfast.

Some of the initially solutioned sultone adduct of the terpolymer is precipitated from solution by the addition of water, collected by filtration, dried and then re-solutioned in DMA. Films cast from this precipitated and re-solutioned adduct give better dyeability (i.e., dye to a deeper shade), when dyed in the same manner previously described, than do the films obtained from the once-solutioned adduct. Furthermore, the films from the twice solutioned adduct are most washfast of any of the films of either of Examples 1 and 2.

EXAMPLE 3

Same as in Example 1 with the exception that, instead of starting with a copolymer obtained by copolymerization, of by weight, 85% acrylonitrile, 5% methyl acrylate and 10% acrylic acid, there is employed a starting copolymer for making the adduct wherein 5% by weight of vinyl acetate has been substituted for 5% methyl acrylate.

Similar results are obtained both from the standpoint of yield, basic dye-receptivity and washwastness characteristics.

EXAMPLE 4

A copolymer of, by weight, 93% acrylonitrile (AN) and 7% methyl acrylate (MA) based on the charge of monomers, is prepared as follows.

Materials and quantities

Acid solution:
  Distilled water _____ 600 g.
  Concentrated $H_2SO_4$ ____ 0.5 g.
Monomeric mixture:
  Acrylonitrile _____ 186 g.
  Methyl acrylate _____ 14 g.
Initiator solutions:
  Potassium persulfate ____ 3.514 g. (0.013 mole) in 100 ml. distilled water.
  Sodium metabisulfite ____ 2.471 g. (0.13 mole) in 100 ml. distilled water.

The reaction vessel and auxiliary equipment, the general procedure, the order and amount of ingredients charged, the polymerization temperature, and the technique for collecting and drying the product are the same as that described under Example 1. In another identical run a copolymer is made of, by weight, 93% acrylonitrile and 7% vinyl acetate (VA). These copolymers have I.V. values ranging from 1.48 to 1.72 as measured using a 0.1 wt. % concentration of each in DMF at 25° C.

Solutions are made containing the acrylonitrile/methyl acrylate (or the acrylonitrile/vinyl acetate) copolymer and the sultone adduct of the acrylonitrile terpolymer of Example 1 as follows:

|  | Grams |
|---|---|
| Dimethylacetamide | 80.0 |
| 93/7 copolymer of AN/MA or of AN/VA | 19.5 |
| Sultone adduct of the acrylonitrile terpolymer of Example 1 | 0.5 |

The finely divided acrylonitrile copolymers and of the sultone-acrylonitrile adduct in the stated proportions are added to the DMA solvent while agitating and heating the mixture at about 50°–60° C. Films are cast upon a glass substrate from each of the resulting solutions, followed by vacuum-oven drying, stripping from the glass substrate and dyeing with a cationic dye as has been described under Example 1.

Solutions of control copolymers (20 g. of the copolymer in 80 g. DMA) are prepared, cast upon a glass substrate, vacuum-oven dried, stripped therefrom and dyed under identical conditions as the test samples.

The test films of both AN/MA and AN/VA copolymers modified with the sultone adduct are dyed to a much heavier depth of blue than are the control specimens which are barely stained.

Substantially the same results are obtained when other sultone adducts of the kind with which this invention is concerned are used in place of he 1,3-propane addult of Example 1, namely:

1,3-propane sultone adduct of the sodium salt of a ternary copolymer of 85% AN, 5% MA and 10% methacrylic acid (MAA);
1,3-propane sultone adduct of the sodium salt of a binary copolymer of 92% AN and 8% AA;
1,4-butane sultone adduct of the sodium salt of a ternary polymer of 85% AN, 5% MA and 10% AA;
1,5-pentane sultone adduct of the sodium salt of a ternary polymer of 85% AN, 5% VA and 10% MAA; and
1,3-propane sultone adduct of the sodium salt of a ternary polymer of 88% AN, 6% VA and 6% AA.

The foregoing percentages are weight percentages based on the charge of monomers to the reactor to form the respective acrylonitrile polymers from which the corresponding sodium salts are made, as decribed in Example 1 with particular reference to the ternary polymer of that example, which salts are then reacted with the sultone to yield the adduct of the sultone and the acrylonitrile polymer.

Instead of using 2.5% of the individual sultone adducts with the dye-resistant acrylonitrile copolymers of this example, one may use either lesser or greater amounts, for example as low as about 1% or as high as about 5%.

It will be understood, of course, by those skilled in the art that the present invention is not limited only to the particular starting reactants, proportions thereof and methods of preparation given by way of illustration in the foregoing examples. Thus, instead of 1,3-propane sultone there may be used a naphthosultone, e.g., 1,8-naphthosultone or any other sultone of the kind embraced by Formula I of which numerous specific examples have been given; and, instead of the specific acrylonitrile copolymers set forth in the numbered examples, there may be employed in making the sultone adduct any other acrylonitrile copolymer, different from those used in the specific examples, and which contains a salt moiety of the kind embraced by Formula II. Numerous examples of monomers that may be copolymerized with (a) acrylonitrile and (b) acrylic and/or methacrylic acid, in addition to methyl acrylate and vinyl acetate employed in the individual examples, have been given hereinbefore and in the Conciatori et al. cited patent; and such copolymers then can be converted into their salt form for reaction with the sultone as broadly described previously and specifically illustrated in the examples.

The embodiments of the invention in which an exclusive property or privilege is claimed are defined as follows:

1. A composition of matter comprising the reaction product of (a) a sultone selected from the group consisting of naphthosultones and sultones represented by the general formula $$\begin{array}{c} O \diagdown \diagup O \\ S \\ R' \diagup \diagdown O \\ \diagdown CHR \diagup \end{array}$$

wherein R represents hydrogen or a lower alkyl radical and R' represents an alkylene or arylene radical containing from 1 to 6 carbon atoms, inclusive, and (b) an acrylonitrile copolymer of at least about 75 percent acrylonitrile containing moieties represented by the general formula $$\begin{array}{c} -CH_2-CR''- \\ | \\ C=O \\ | \\ O-M \end{array}$$

wherein R'' represents hydrogen or a methyl radical and M represents an alkali metal, the said moieties constituting an average of from 0.2 to about 45 percent of the total number of monomer residues from individual monomers in the said copolymer, and the amount of the said sultone employed being the stoichiometrical equivalent theoretically required to convert some or all of the $$\begin{array}{c} O \\ \| \\ -C-O-M \end{array}$$

groups in the said moieties to $$\begin{array}{c} O \\ \| \\ -C-O-R'-CHR-SO_3M \end{array}$$

groups wherein R and R' have the same meanings as given above with reference to the first formula.

2. A composition as in claim 1 wherein M represents sodium and the amount of the said sultone employed is at least the stoichiometrical equivalent theoretically required to convert all of the

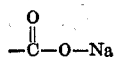

groups in the said moieties to

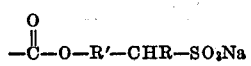

groups.

3. A composition as in claim 1 wherein the sultone is 1,3-propane sultone.

4. A composition as in claim 2 wherein the sultone is 1,3-propane sultone.

5. A composition as in claim 1 wherein R'' in the general formula for moieties contained in the acrylonitrile copolymer of (b) represents hydrogen and M represents sodium; said moieties constitute an average of from about 0.5 to about 20 percent of the total number of mers from individual monomers in the said copolymer; and the amount of the sultone employed is at least the stoichiometrical equivalent theoretically required to convert all of the

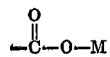

groups in the said moieties to

groups.

6. A composition as in claim 1 wherein the defined reaction product is dissolved in an organic solvent.

7. A composition as in claim 6 wherein the organic solvent is dimethylacetamide.

8. A composition as in claim 1 wherein the acrylonitrile copolymer of (b) is a copolymer of (A) acrylonitrile, (B) sodium acrylate or methacrylate and (C) at least one other monomer which is copolymerizable with the monomers of (A) and (B), which contains a terminal ethylenically-unsaturated grouping, and which is free from dye sites for basic dyes, the different monomer residues from the monomers of (A), (B), and (C) being present in the said copolymer in average percentage values, based on the total number of monomer residues from individual monomers in the said copolymer, within the following ranges:

(A) from 75% to about 95%,
(B) from 0.5% to about 15%, and
(C) from 3% to about 15%, the total of (A), (B), and (C) being 100%.

9. A composition as in claim 8 wherein the (B) component is sodium acrylate and the (C) component is methyl acrylate.

10. A composition as in claim 8 wherein the (B) component is sodium acrylate and the (C) component is vinyl acetate.

11. The composition of claim 1 in the form of a shaped article that is dyeable with a basic dye.

12. A composition as in claim 11 wherein the shaped article is in the form of a film.

13. A composition as in claim 11 wherein the shaped article is in the form of filamentary material.

14. A composition as in claim 1 wherein the sultone is 1,3-propane sultone; the acrylonitrile copolymer of (b) is a copolymer of (A) acrylonitrile, (B) sodium acrylate, and (C) methyl acrylate, the different monomer residues from the monomers of (A), (B), and (C) being present in the said copolymer in average percentage values, based on the total number of monomer residues from individual monomers in the said copolymer, within the following ranges:

(A) from about 80% to about 95%,
(B) from about 1% to about 15%, and
(C) from about 3% to about 15%, the total of (A), (B), and (C) being 100%.

15. A process comprising:
(A) dissolving an acrylontrile copolymer in an organic solvent in which it is soluble,
said copolymer containing moieties represented by the general formula

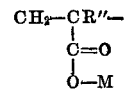

wherein R'' represents hydrogen or a methyl radical and M represents an alkali metal, the said moieties constituting an average of from 0.2 to about 45 percent of the total number of monomer residues from individual monomers in the said copolymer, and
the amount of the copolymer that is dissolved in the said organic solvent being such as will provide a solution containing, by weight, from about 5% to about 30% of the said copolymer;

(B) adding to the resulting solution a sultone selected from the group consisting of naphthosultones and sultones represented by the general formula

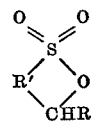

wherein R represents hydrogen or a lower alkyl radical and R' represents an alkylene or arylene radical containing from 1 to 6 carton atoms, inclusive,
the amount of the said sultone employed being the stoichiometrical equivalent theoretically required to convert some or all of the

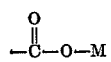

groups in the said moieties to

groups wherein R and R' have the same meanings as given above with reference to the last-given formula; and (C) agitating the resulting admixture at a temperature and for a period of time sufficient to effect the conversion described under (B).

16. A process as in claim 15 wherein the organic solvent is dimethylacetamide.

17. A process as in claim 15 wherein the admixture is agitated to effect the desired conversion at a temperature within the range of from 40° C. to about 90° C. for a period of from about ¼ to about 4 hours.

18. The process as in claim 15 which includes the additional step, subsequent to step (C) of extruding the solution containing the sultone-reacted copolymer through an opening of predetermined cross-section into a liquid nonsolvent for the said copolymer thereby to form a shaped article.

19. The process as in claim 15 which includes the additional step, subsequent to step (C) of extruding the solution containing the sultone-reacted copolymer through an opening of predetermined cross-section into an evaporative atmosphere, thereby forming a shaped article.

References Cited

UNITED STATES PATENTS

| 3,017,397 | 1/1962 | Fournet et al. |
| 3,260,707 | 7/1966 | Caldwell et al. |

MORRIS LIEBMAN, Primary Examiner

L. T. JACOBS, Assistant Examiner

U.S. Cl. X.R.

260—41, 79.3; 264—176, 178

PO-1050
(5/69)

UNITED STATES PATENT OFFICE
CERTIFICATE OF CORRECTION

Patent No. __3,475,364__ Dated __October 28, 1969__

Inventor(s) __Louis E. Trapasso__

It is certified that error appears in the above-identified patent and that said Letters Patent are hereby corrected as shown below:

In column 5, line 38, "25 or 25" should be ---20 or 25---.

In column 5, line 69, "7 to 8%" should be ---7 or 8%---.

In column 7, line 37, after "and", insert ---at---.

In column 8, line 62, "N,N-diethyl-", first instance, should be ---N,N-dimethyl---.

In column 10, line 52, "from" should be ---form---.

In column 11, line 6, "washwastness" should be ---washfastness---

In column 11, line 62 "of he" should be ---of the---.

In column 11, line 62, "addult" should be ---adduct---.

Signed and sealed this 16th day of May 1972.

(SEAL)
Attest:

EDWARD M. FLETCHER, JR.
Attesting Officer

ROBERT GOTTSCHALK
Commissioner of Patents